(12) United States Patent
Okuyama et al.

(10) Patent No.: US 11,457,418 B2
(45) Date of Patent: *Sep. 27, 2022

(54) WIRELESS TERMINAL, TRANSMISSION POWER CONTROL METHOD, AND WIRELESS BASE STATION

(71) Applicant: NTT DOCOMO, INC., Tokyo (JP)

(72) Inventors: Tatsuki Okuyama, Tokyo (JP); Satoshi Suyama, Tokyo (JP); Jun Mashino, Tokyo (JP); Shohei Yoshioka, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/490,133

(22) PCT Filed: Feb. 7, 2018

(86) PCT No.: PCT/JP2018/004198
§ 371 (c)(1),
(2) Date: Aug. 30, 2019

(87) PCT Pub. No.: WO2018/159242
PCT Pub. Date: Sep. 7, 2018

(65) Prior Publication Data
US 2020/0015172 A1    Jan. 9, 2020

(30) Foreign Application Priority Data

Mar. 2, 2017 (JP) .............................. JP2017-039677

(51) Int. Cl.
*H04W 52/24* (2009.01)
*H04B 7/0426* (2017.01)
(Continued)

(52) U.S. Cl.
CPC ........ *H04W 52/242* (2013.01); *H04B 7/0426* (2013.01); *H04W 16/28* (2013.01); *H04W 52/325* (2013.01)

(58) Field of Classification Search
CPC ........ H04B 7/0426; H04B 7/022; H04B 7/06; H04W 16/28; H04W 52/242
See application file for complete search history.

(56) References Cited

U.S. PATENT DOCUMENTS 6,697,633 B1 *  2/2004  Dogan .............. H04L 25/03993
                                              455/450
10,305,636 B1 *  5/2019  Shattil ................... H04L 1/0001
(Continued)

FOREIGN PATENT DOCUMENTS

JP       2011234334 A      11/2011
JP       2013511170 A      3/2013

OTHER PUBLICATIONS

T. Okuyama et.al.: "Antenna Deployment for 5G Ultra High-Density Distributed Antenna System at Low SHF Bands" Standards for Communications and Networking (CSCN), 2016, pp. 1-6, Nov. 2016, Berlin, Germany (6 pages).
(Continued)

*Primary Examiner* — Syed Ali
(74) *Attorney, Agent, or Firm* — Osha Bergman Watanabe & Burton LLP

(57) ABSTRACT

A radio terminal that performs radio communication with a radio base station including a plurality of transmission points each including at least one antenna element and a signal processing unit connected to the plurality of transmission points includes a plurality of antenna elements, an estimating section that estimates path-loss between each of the plurality of antenna elements and the plurality of transmission points, and a calculating section that calculates a power control weight for controlling transmission power of
(Continued)

the plurality of antenna elements based on the path-loss for the antenna element that has been estimated by the estimating section.

4 Claims, 10 Drawing Sheets

(51) Int. Cl.
*H04W 16/28* (2009.01)
*H04W 52/32* (2009.01)

(56) References Cited

U.S. PATENT DOCUMENTS

| | | | | |
|---|---|---|---|---|
| 2010/0298006 | A1* | 11/2010 | Ko | H04B 7/022 |
| | | | | 455/452.2 |
| 2012/0195264 | A1* | 8/2012 | Taoka | H04B 7/0639 |
| | | | | 370/328 |
| 2013/0100828 | A1* | 4/2013 | Kishiyama | H04W 52/242 |
| | | | | 370/252 |
| 2016/0050003 | A1* | 2/2016 | Ko | H04B 7/0478 |
| | | | | 370/329 |
| 2017/0353224 | A1* | 12/2017 | Wang | H04B 7/0665 |
| 2018/0309496 | A1* | 10/2018 | Lee | H04L 5/0044 |
| 2018/0324738 | A1* | 11/2018 | Stirling-Gallacher | |
| | | | | G01S 5/0036 |
| 2019/0020381 | A1* | 1/2019 | Tooher | H04W 72/14 |
| 2019/0075526 | A1* | 3/2019 | Nagaraj | H04B 7/0408 |
| 2020/0221427 | A1* | 7/2020 | Nilsson | H04W 36/0027 |

OTHER PUBLICATIONS

T. Okuyama et al., "Throughput Performance on 5G Ultra High-Density Distributed Antenna System using Digital FBCP at Low SHF band", IEICE technical report, Aug. 11, 2016, vol. 116, No. 184, pp. 77-82 (6 pages).

International Search Report issued in International Application No. PCT/JP2018/004198, dated Apr. 24, 2018 (5 pages).

Written Opinion issued in International Application No. PCT/JP2018/004198; dated Apr. 24, 2018 (5 pages).

International Search Report issued in International Application No. PCT/JP2018/004198, dated Feb. 7, 2018 (5 pages).

Written Opinion issued in International Application No. PCT/JP2018/004198; dated Feb. 7, 2018 (5 pages).

Office Action in counterpart Japanese Patent Application No. 2017-039677 dated Apr. 13, 2021 (8 pages).

* cited by examiner

WIRELESS TERMINAL, TRANSMISSION POWER CONTROL METHOD, AND WIRELESS BASE STATION

TECHNICAL FIELD

The present invention relates to a radio terminal, a transmission power control method, and a radio base station.

BACKGROUND ART

Long Term Evolution (LTE) has been specified for achieving a higher data rate, lower latency, and the like in a Universal Mobile Telecommunications System (UMTS) network (see Non-Patent Literature (hereinafter referred to as "NPL") 1). Successor systems of LTE have been also studied for achieving a broader bandwidth and a higher speed based on LTE. Examples of successor systems of LTE include the systems called LTE-A (LTE-Advanced), FRA (Future Radio Access), 5G (5th generation mobile communication system), 5G+ (5G plus), and New-RAT (Radio Access Technology)).

Use of Massive Multiple Input Multiple Output (MIMO) using a large number of antenna elements (at least 100 elements, for example) in a high-frequency band (at least 4 GHz, for example) has been studied for the future radio communication system (for example, 5G) for a further increase in speed of signal transmission and reduction in interference. Further, a radio communication system based on an ultrahigh-density distributed antenna system including a signal processing unit and transmission points each including at least one antenna element has been studied (NPL 1, for example).

CITATION LIST

Non-Patent Literature

NPL 1
T. Okuyama et. al.: "Antenna Deployment for 5G Ultra High-Density Distributed Antenna System at Low SHF Bands" Standards for Communications and Networking (CSCN), 2016, pp. 1-6, November 2016, Berlin, Germany

SUMMARY OF INVENTION

Technical Problem

However, at present, no proposal has been made for improvement in communication quality by performing transmission power control on a radio terminal that performs radio communication with a transmission point.

In view of the circumstances described above, an object of the present invention is to provide a technology for improving communication quality by performing transmission power control on a radio terminal that performs radio communication with a transmission point.

Solution to Problem

A radio terminal according to the present invention is a radio terminal that performs radio communication with a radio base station including: a plurality of transmission points each including at least one antenna element; and a signal processing unit connected to the plurality of transmission points, the radio terminal including: a plurality of antenna elements; an estimating section that estimates path-loss between each of the plurality of antenna elements and the plurality of transmission points; and a calculating section that calculates a power control weight for controlling transmission power of each of the plurality of antenna elements based on the path-loss for the antenna element that has been estimated by the estimating section.

Advantageous Effects of Invention

The present invention allows improvement in communication quality by performing transmission power control on a radio terminal that performs radio communication with a transmission point.

DESCRIPTION OF EMBODIMENTS

Hereinafter, embodiments of the present invention will be described with reference to the accompanying drawings.

To handle enormously increasing radio communication traffic, high-frequency-band small cells and Massive-MIMO have been studied for a next-generation radio communication system (5G for example). For example, use of a high-frequency band ranging from several gigahertz to several tens of gigahertz can ensure resources over a wide bandwidth. Further, for example, radio communication using at least 100 antenna elements allows advanced beam forming (BF), reduction in interfering, or effective use of resources.

In the next-generation radio communication system, a further-ultrahigh-density distributed antenna system has been studied. A radio base station in the ultrahigh-density distributed antenna system includes, for example, a plurality of transmission points each including at least one antenna element and a signal processing unit connected to the plurality of transmission points. The transmission points are each called an extension station and the signal processing unit is called a baseband processing unit (BBU) in some cases.

Embodiment 1

Figure 1:
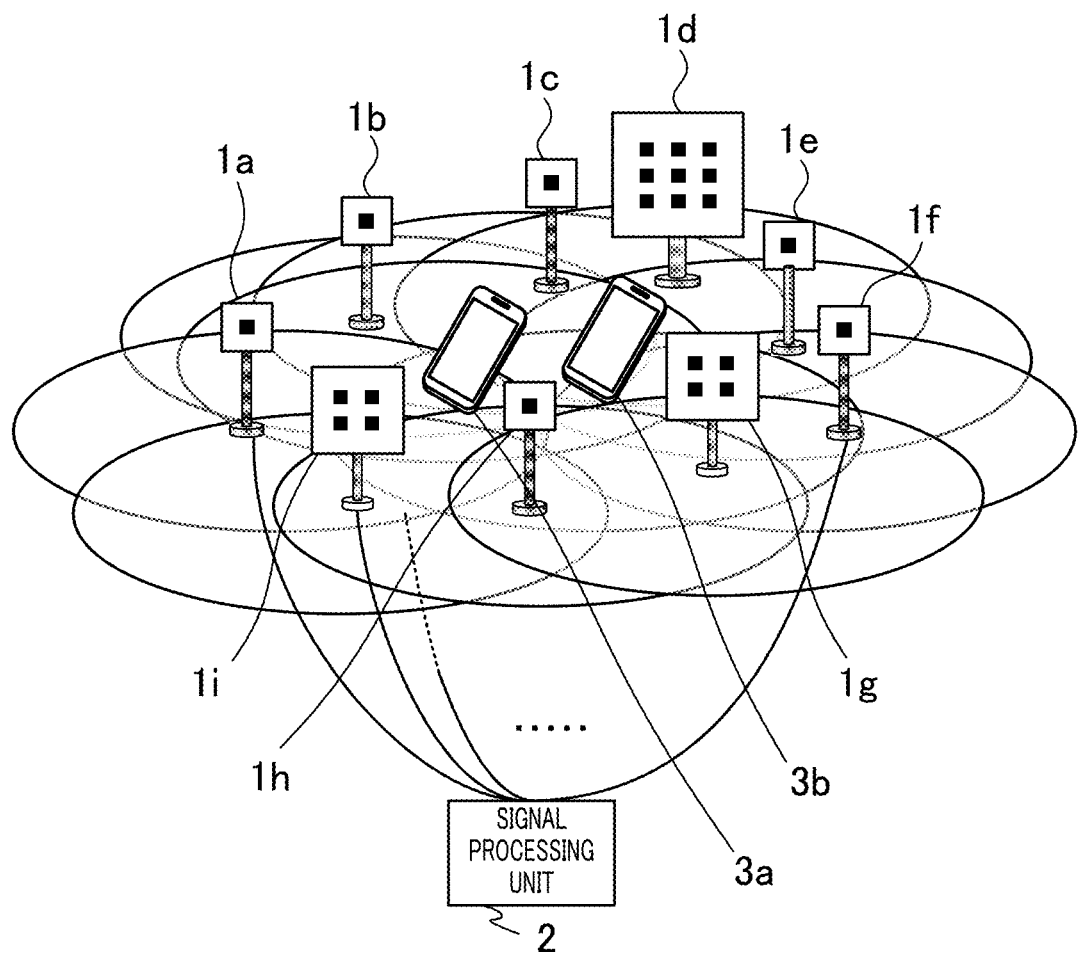
FIG. 1 illustrates a system configuration example in which radio terminals according to Embodiment 1 are used.

FIG. 1 illustrates a system configuration example in which radio terminals according to Embodiment 1 are used. A radio base station includes transmission points 1a to 1i and signal processing unit 2, as illustrated in FIG. 1. The radio base station illustrated in FIG. 1 uses an ultrahigh-density distributed antenna system to perform radio communication with radio terminals 3a and 3b, which are subordinate to transmission points 1a to 1i (which are present in cell).

Transmission points 1a to 1i each include at least one antenna element. Transmission points 1a to 1i are each connected to signal processing unit 2. Transmission points 1a to 1i each form a cell.

Signal processing unit 2 performs signal processing on a signal to be transmitted to each of radio terminals 3a and 3b. The signals on which the signal processing has been performed are output to transmission points 1a to 1i and wirelessly transmitted to radio terminals 3a and 3b. Further, signals transmitted from radio terminals 3a and 3b and received by transmission points 1a to 1i are received by signal processing unit 2 from transmission points 1a to 1i. Signal processing unit 2 performs signal processing on the signals received from transmission points 1a to 1i.

FIG. 1 illustrates two radio terminals 3a and 3b, but not necessarily. For example, one radio terminal subordinate to transmission points 1a to 1i may be present. Still instead, three or more radio terminals subordinate to transmission points 1a to 1i may be present.

Figure 2:
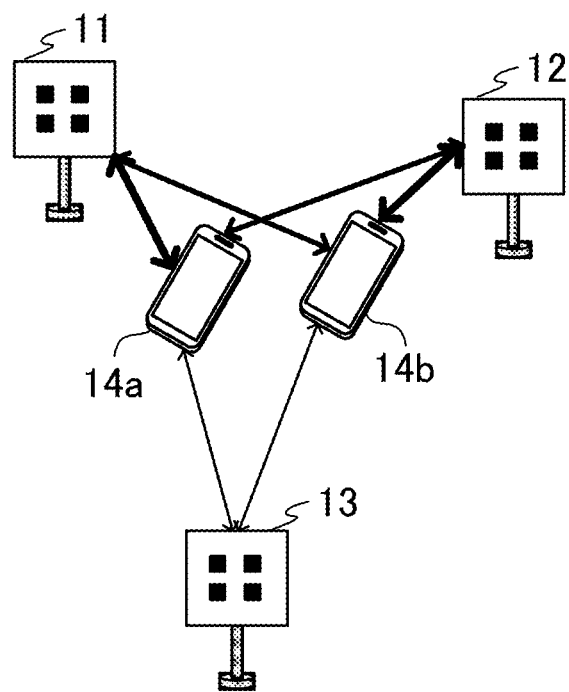
FIG. 2 describes an example of path-loss in an ultrahigh-density distributed antenna system.

FIG. 2 describes an example of path-loss in the ultrahigh-density distributed antenna system. The following description will be made of a case where the number of transmission points is three for ease of description. FIG. 2 illustrates transmission points 11 to 13 and radio terminals 14a and 14b.

In the ultrahigh-density distributed antenna system, the path-loss between transmission points 11 to 13 and radio terminals 14a, 14b varies depending, for example, on the positions of radio terminals 14a and 14b. For example, the greater the distances between transmission points 11 to 13 and radio terminals 14a, 14b, the greater the magnitude of the path-loss between transmission points 11 to 13 and radio terminals 14a, 14b.

The bidirectional arrows illustrated in FIG. 2 each represent the magnitude of the path-loss between radio terminals 14a, 14b and transmission points 11 to 13 in the form of the thickness of the arrow. For example, in FIG. 2, the thinner a bidirectional arrow, the greater the path-loss. Specifically, the path-loss between transmission point 11 and radio terminal 14b is greater than the path-loss between transmission point 11 and radio terminal 14a. Similarly, the path-loss between transmission point 13 and radio terminal 14a is greater than the path-loss between transmission point 12 and radio terminal 14a.

As described above, the path-loss between radio terminals 14a, 14b and transmission points 11 to 13 varies depending, for example, on the positions of radio terminals 14a and 14b. In view of the fact described above, radio terminals 14a and 14b each perform transmission power control on an antenna element basis in uplink communication to improve the communication quality.

For example, radio terminals 14a and 14b each increase the transmission power when the magnitude of the path-loss is large to improve the uplink communication quality. Similarly, radio terminals 14a and 14b each decrease the transmission power when the magnitude of the path-loss is small to reduce interference power.

Figure 3:
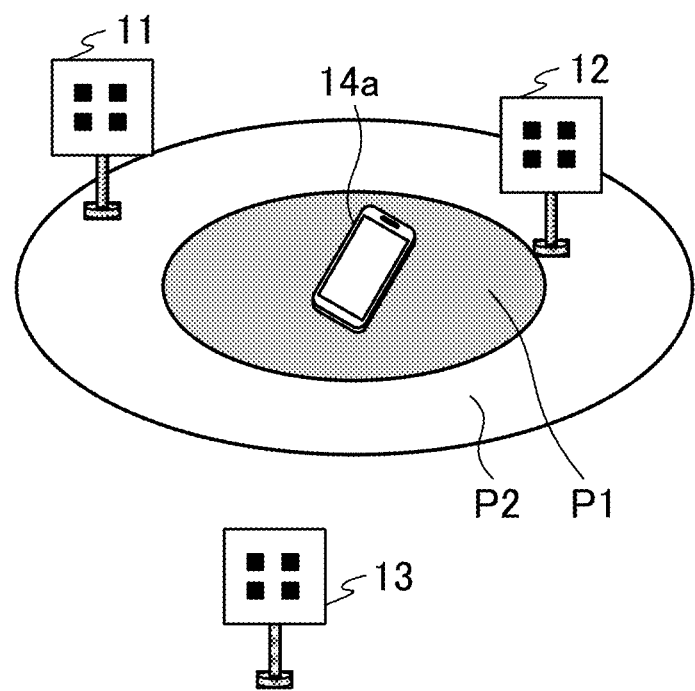
FIG. 3 is a first diagram for describing an example of transmission power control performed by a radio terminal in the ultrahigh-density distributed antenna system.

FIG. 3 is a first diagram for describing an example of the transmission power control performed by a radio terminal in the ultrahigh-density distributed antenna system. In FIG. 3, the same components as those in FIG. 2 have the same reference character.

Transmission power intensity P1 illustrated in FIG. 3 represents the transmission power intensity before the transmission power control performed by radio terminal 14a. Transmission power intensity P2 illustrated in FIG. 3 represents the transmission power intensity after the transmission power control performed by radio terminal 14a.

Radio terminal 14a increases the transmission power when a large magnitude of path-loss occurs in relation to transmission points 11 to 13. For example, radio terminal 14a increases the transmission power from transmission power intensity P1 to transmission power intensity P2. The process described above allows radio terminal 14a to improve the communication quality.

Figure 4:
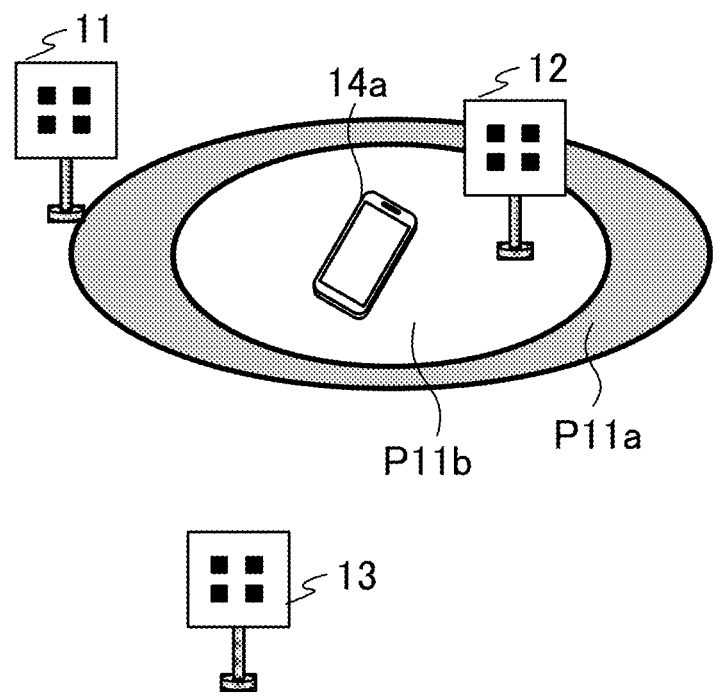
FIG. 4 is a second diagram for describing an example of transmission power control performed by the radio terminal in the ultrahigh-density distributed antenna system.

FIG. 4 is a second diagram for describing an example of the transmission power control in the ultrahigh-density distributed antenna system. In FIG. 4, the same components as those in FIG. 3 have the same reference character.

Transmission power intensity P11a illustrated in FIG. 4 represents the transmission power intensity before the transmission power control performed by radio terminal 14a. Transmission power intensity P11b represents the transmission power intensity after the transmission power control performed by radio terminal 14a.

Radio terminal 14a decreases the transmission power when a small magnitude of path-loss occurs in relation to transmission points 11 to 13. For example, radio terminal 14a decreases the transmission power from transmission power intensity P11a to transmission power intensity P11b. The process described above allows radio terminal 14a to reduce the interference power and hence improve the communication quality.

Figure 5:
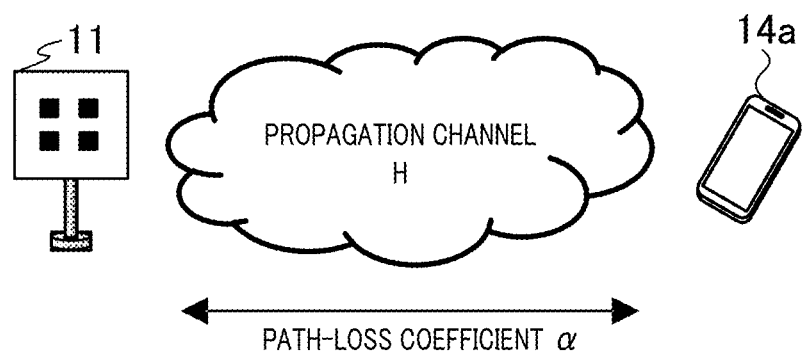
FIG. 5 describes path-loss.

FIG. 5 describes the path-loss. In FIG. 5, the same components as those in FIG. 4 have the same reference character.

A signal "r" received by radio terminal 14a when transmission point 11 transmits reference signal "s" is expressed by the following equation 1, where "z" represents a noise signal, "H" represents a propagation channel between transmission point 11 and radio terminal 14a, and "α" represents a path-loss coefficient.

[1]

$$r = \alpha H s + z \qquad \text{(Equation 1)}$$

The energy of propagation channel "H" itself is constant irrespective of the distance between transmission point 11 and radio terminal 14a and other factors. Equation 1 therefore shows that the magnitude of the signal received by radio terminal 14a varies in accordance with the magnitude of the path-loss (path-loss coefficient "α").

The path-loss between transmission point 11 and radio terminal 14a (path-loss coefficient "α") can therefore be estimated by transmitting the reference signal from transmission point 11 (known constant-energy signal, for example) and estimating propagation channel "H" at radio terminal 14*a*.

In time division duplex (TDD) transmission, reciprocity is present between the downlink and the uplink. Radio terminal 14*a* can therefore estimate the path-loss in the uplink from the reference signal transmitted from transmission point 11.

Figure 6:
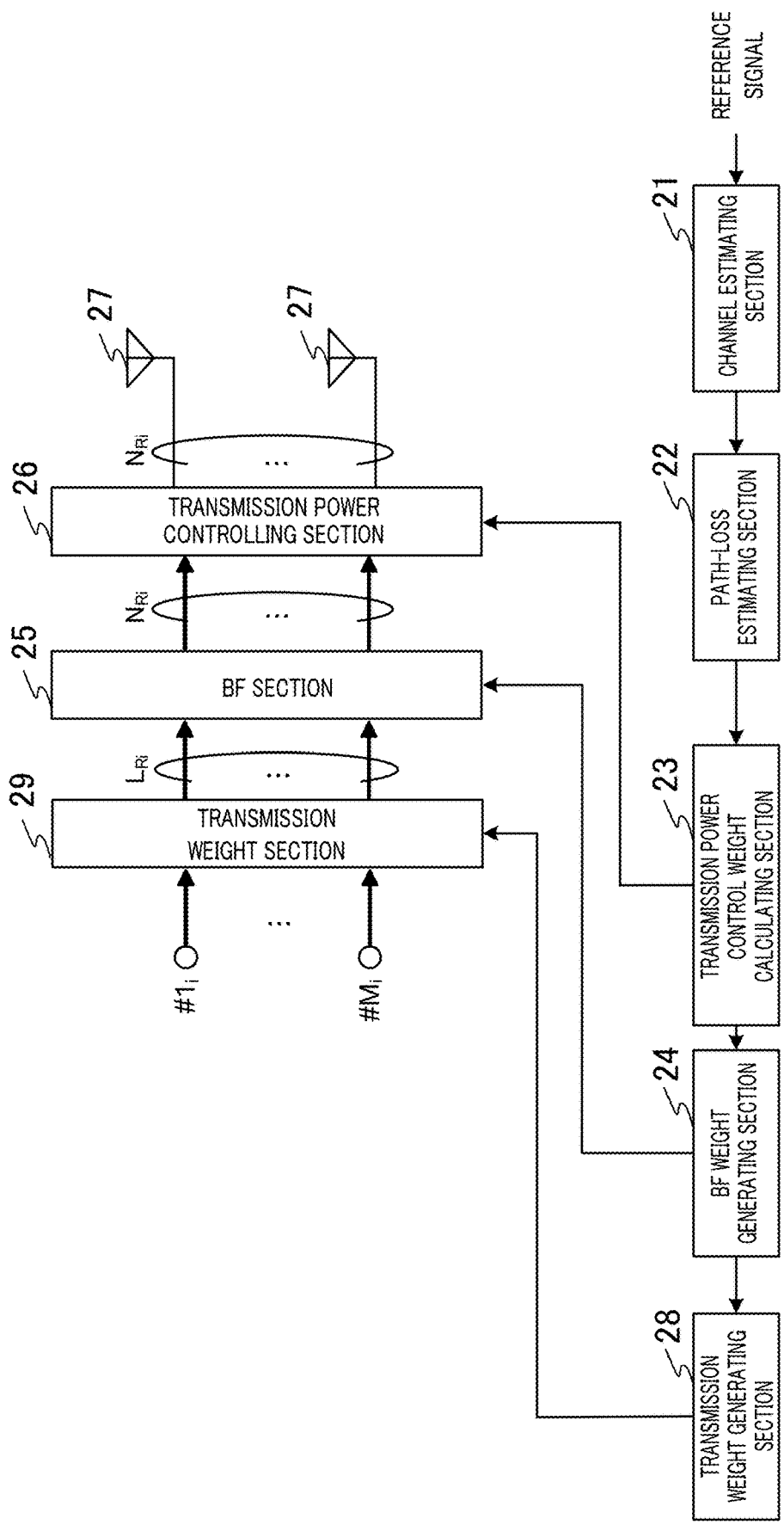
FIG. 6 illustrates an example of the block configuration of the radio terminal.

FIG. 6 illustrates an example of the block configuration of radio terminal 3*a*. Radio terminal 3*a* includes channel estimating section 21, path-loss estimating section 22, transmission power control weight calculating section 23, BF weight generating section 24, BF section 25, transmission power controlling section 26, a plurality of antenna elements 27, transmission weight generating section 28, and transmission weight section 29, as illustrated in FIG. 6. Radio terminal 3*b* has the same block configuration as that of radio terminal 3*a* and will therefore not be described.

Channel estimating section 21 estimates (measures) the channels (channel matrix $H_i$) between radio terminal 3*a* and transmission points 1*a* to 1*i* from the reference signals transmitted from transmission points 1*a* to 1*i*. Reference character "i" represents an i-th radio terminal. For example, in a case where radio terminal 3*a* is a first radio terminal, i=1.

Path-loss estimating section 22 estimates (measures) the path-loss between each of antenna elements 27 and transmission points 1*a* to 1*i* from the channel ($H_i$) estimated by channel estimating section 21. The estimation of the path-loss between each of antenna elements 27 and transmission points 1*a* to 1*i* will be described below in detail.

Transmission power control weight calculating section 23 calculates a transmission power control weight ($D_i$) for controlling transmission power of each of antenna elements 27 based on the path-loss that occurs at antenna element 27 and estimated by path-loss estimating section 22. The calculation of the transmission power control weight will be described below in detail.

BF weight generating section 24 generates an equivalent channel (equivalent channel matrix $H_i D_i$) containing the transmission power control weight ($D_i$) calculated by transmission power control weight calculating section 23. BF weight generating section 24 uses the generated equivalent channel ($H_i D_i$) to generate a BF weight ($W_{Ri}$) for forming a transmission beam. BF weight generating section 24 may instead generate the BF weight by using any other arbitrary method.

Transmission weight generating section 28 uses an equivalent channel ($H_i D_i W_{Ri}$) that is the equivalent channel multiplied by the BF weight ($W_{Ri}$) to generate a transmission weight ($P_i$) that determines a method for inputting $M_i$ streams corresponding to $L_{Ri}$ beams. Transmission weight generating section 28 may instead generate the transmission weight by using any other arbitrary method.

Transmission weight section 29 receives "#$1_i$ to #$M_i$" $M_i$ streams as inputs. Transmission weight section 29 multiplies the input $M_i$ streams by the transmission weight ($P_i$) generated by transmission weight generating section 28. Transmission weight section 29 outputs a data signal representing the result of the transmission weight multiplication to BF section 25.

BF section 25 multiplies the data signal output from transmission weight section 29 by the BF weight ($W_{Ri}$) generated by BF weight generating section 24. BF section 25 outputs a data signal representing the result of the BF weight multiplication to transmission power controlling section 26.

Transmission power controlling section 26 multiplies the data signal output from BF section 25 by the transmission power control weight ($D_i$) calculated by transmission power control weight calculating section 23. Transmission power controlling section 26 outputs the data signal representing the result of the transmission power control weight multiplication to antenna elements 27.

A transmission vector of the $M_i$ streams is called "$s_i$". A reception signal vector received by the radio base station is called "$r_i$", and a noise signal vector is called "$z_i$". Under these definitions, reception signal vector "$r_i$" received from the i-th radio terminal by the radio base station is expressed by the following equation 2:

[2]

$$r_i = W_T H_i D_i W_{Ri} P_i s_i + z_i \qquad \text{(Equation 2)}$$

Equation 2 described above represents the reception signal vector in a case where the radio base station performs BF. Equation 2 therefore contains reception-side BF weight "$W_T$".

In the example illustrated in FIG. 6, transmission weight section 29 outputs "$L_{Ri}$" data signals. BF section 25 outputs "$N_{Ri}$" data signals. Transmission power controlling section 26 outputs "$N_{Ri}$" data signals. Reference character "$N_{Ri}$" represents the total number of antenna elements 27 provided in radio terminal 3*a*.

Radio terminal 3*a* in FIG. 6 forms "$L_{Ri}$" beams. In a case where radio terminal 3*a* does not perform BF on the data signals, the BF weight ($W_{Ri}$) is a unit matrix, and "$L_{Ri} = N_{Ri}$."

Let "$L_T$" be the number of beams received by the radio base station and "$N_T$" be the total number of antenna elements of the radio base station. In a case where the radio base station does not perform BF, the BF weight ($W_T$) is a unit matrix, and "$L_T = N_T$."

Noise signal vector "$z_i$" in equation 2 has a matrix size "$L_T \times 1$." $M_i$ stream transmission vector "$s_i$" has a matrix size "$M_i \times 1$." Transmission weight "$P_i$" has a matrix size "$L_{Ri} \times M_i$." BF weight "$W_{Ri}$" has a matrix size "$N_{Ri} \times L_{Ri}$." Transmission power control weight "$D_i$" has a matrix size "$N_{Ri} \times N_{Ri}$." Channel matrix "$H_i$" has a matrix size "$N_T \times N_{Ri}$." The BF weight ($W_T$) has a matrix size "$L_T \times N_T$." The reception signal vector has a matrix size "$L_T \times 1$."

In FIG. 6, IFFT and the like are omitted. In the case of OFDM transmission, radio terminal 3*a* includes a configuration section that removes CP.

Further, in FIG. 6, a DAC, an up-converter, and the like are omitted. In the case of analog beam forming, BF section 25 includes a phase shifter and an amplifier.

Figure 7:
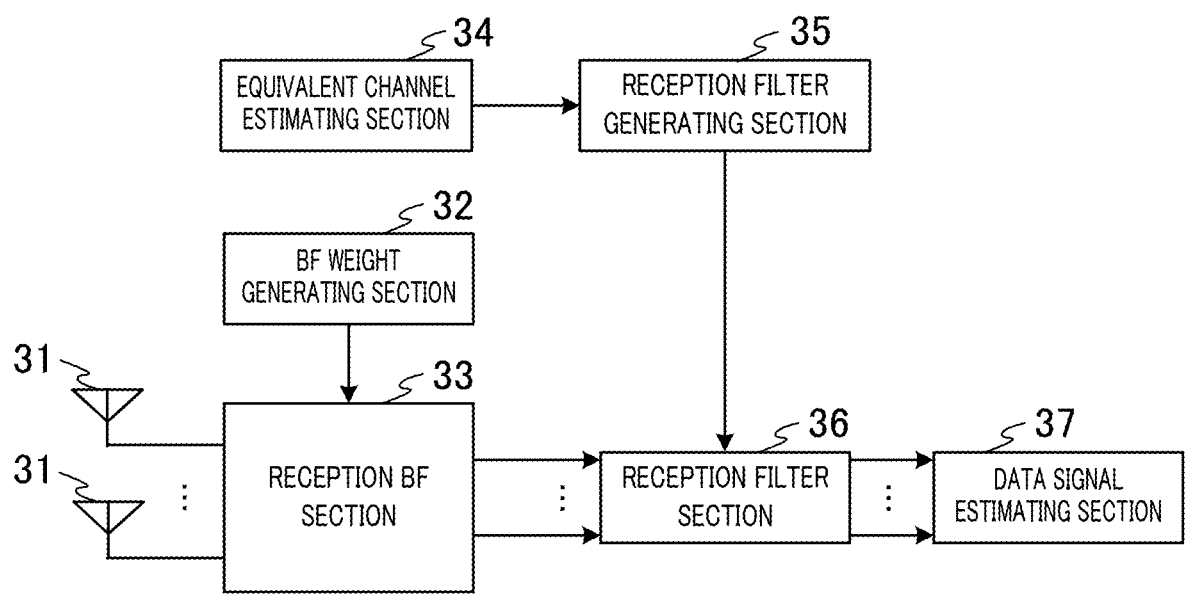
FIG. 7 illustrates an example of the block configuration of a signal processing unit.

FIG. 7 illustrates an example of the block configuration of signal processing unit 2. Signal processing unit 2 includes antennas 31, BF weight generating section 32, reception BF section 33, equivalent channel estimating section 34, reception filter generating section 35, reception filter section 36, and data signal estimating section 37, as illustrated in FIG. 7.

BF weight generating section 32 generates the BF weight ($W_T$) for forming a reception beam. BF weight generating section 32 may generate the BF weight by using any other arbitrary method.

Reception BF section 33 multiplies reception signals received by antennas 31 by the BF weight ($W_T$) generated by BF weight generating section 32. Reception BF section 33 outputs the reception signal after the BF weight multiplication to reception filter section 36.

Equivalent channel estimating section 34 estimates the channels between transmission points 1*a* to 1*i* and radio terminals 3a, 3b. Equivalent channel estimating section 34 may estimate the channels between transmission points 1a to 1i and radio terminals 3a, 3b by using any other arbitrary method.

Reception filter generating section 35 uses the channels estimated by equivalent channel estimating section 34 to generate a weight matrix for extracting the reception signal received from the i-th radio terminal out of the reception signals output from reception BF section 33. Reception filter generating section 35 may generate the weight matrix by using any other arbitrary method. For example, reception filter generating section 35 generates the weight matrix, for example, by using zero-forcing (ZF) or a minimum mean-square error (MMSE).

Reception filter section 36 multiplies the reception signals output by reception BF section 33 by the weight matrix generated by reception filter generating section 35 and outputs the reception signal after the weight matrix multiplication to data signal estimating section 37.

Data signal estimating section 37 estimates the data signal transmitted by the i-th radio terminal from the reception signal output from reception filter section 36.

Although not illustrated in FIG. 7, signal processing unit 2 includes a reference signal transmitting section that transmits a reference signal to each of radio terminals 3a and 3b.

Further, in FIG. 7, FFT and the like are omitted. In the case of OFDM transmission, signal processing unit 2 includes a configuration section that removes CP.

Further, in FIG. 7, a DAC, an up-converter, and the like are omitted. In the case of analog beam forming, reception BF section 33 includes a phase shifter and an amplifier.

Figure 8:
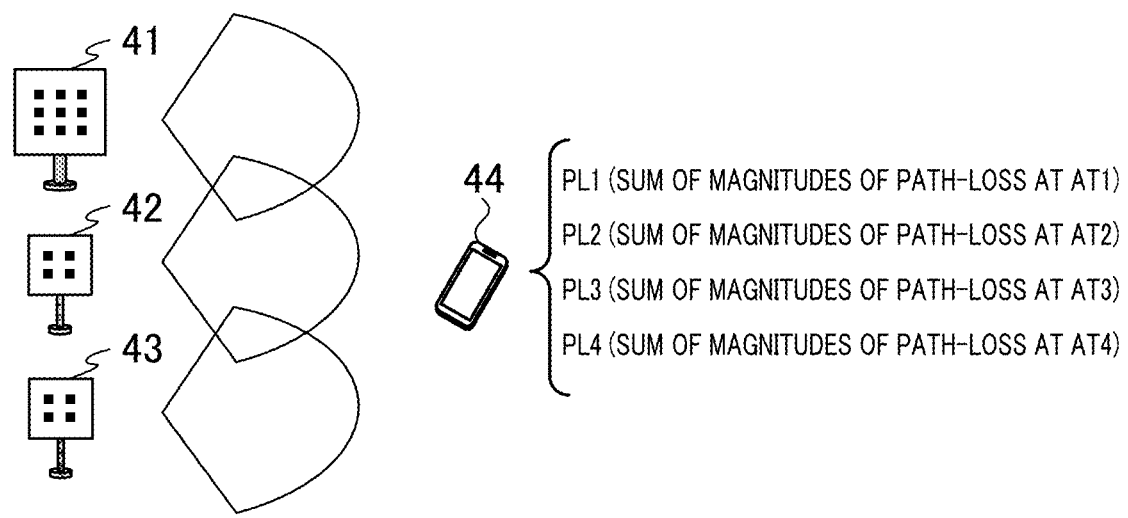
FIG. 8 describes path-loss estimation in the case of a single user.

FIG. 8 describes the path-loss estimation in the case of a single user. The following description will be made of a case where the number of transmission points is three for ease of description. FIG. 8 illustrates transmission points 41 to 43 and radio terminal 44.

Transmission points 41 to 43 each transmit a reference signal. Antenna elements 27 of radio terminal 44 each receive the reference signals transmitted from transmission points 41 to 43.

Channel estimating section 21 estimates the channels between the antenna elements and transmission points 41 to 43 from the reference signals received by the antenna elements of radio terminal 44.

Path-loss estimating section 22 estimates the path-loss between the antenna elements of radio terminal 44 and transmission points 41 to 43 from the channels estimated by channel estimating section 21.

For example, radio terminal 44 is assumed to include four antenna elements AT1 to AT4. In this case, path-loss estimating section 22 estimates the path-loss between antenna element AT1 and each of transmission points 41 to 43. Path-loss estimating section 22 estimates the path-loss between antenna element AT2 and each of transmission points 41 to 43. Path-loss estimating section 22 estimates the path-loss between antenna element AT3 and each of transmission points 41 to 43. Path-loss estimating section 22 estimates the path-loss between antenna element AT4 and each of transmission points 41 to 43.

Transmission power control weight calculating section 23 calculates the coefficient of the transmission power control weight from the path-loss that occurs at each of the antenna elements of radio terminal 44 and is estimated by path-loss estimating section 22. In this process, transmission power control weight calculating section 23 sums the magnitudes of the path-loss that occurs at the antenna elements of radio terminal 44 and transmission points 41 to 43 estimated by path-loss estimating section 22.

For example, transmission power control weight calculating section 23 sums the magnitudes of the path-loss between antenna element AT1 and transmission points 41 to 43. Similarly, transmission power control weight calculating section 23سums the magnitudes of the path-loss between each of antenna elements AT2 to AT4 and transmission points 41 to 43.

"PL1" illustrated in FIG. 8 represents the sum of the magnitudes of the path-loss between antenna element AT1 of radio terminal 44 and transmission points 41 to 43. "PL2" represents the sum of the magnitudes of the path-loss between antenna element AT2 of radio terminal 44 and transmission points 41 to 43. "PL3" represents the sum of the magnitudes of the path-loss between antenna element AT3 of radio terminal 44 and transmission points 41 to 43. "PL4" represents the sum of the magnitudes of the path-loss between antenna element AT4 of radio terminal 44 and transmission points 41 to 43.

Having summed the magnitudes of the path-loss between each of the antenna elements of radio terminal 44 and transmission points 41 to 43, transmission power control weight calculating section 23 calculates the coefficient of the transmission power control weight from the summed path-loss.

In the above description, transmission power control weight calculating section 23 refers to a table based on the summed path-loss, but not necessarily. For example, transmission power control weight calculating section 23 may sum the magnitudes of the path-loss, followed by averaging, and refer to the table by using the averaged path-loss. That is, transmission power control weight calculating section 23 may calculate the average of the magnitudes of the path-loss between each of the antenna elements of radio terminal 44 and transmission points 41 to 43, set the calculated average path-loss to be the path-loss of the antenna element, and calculate the coefficient of the transmission power control weight.

Figure 9:
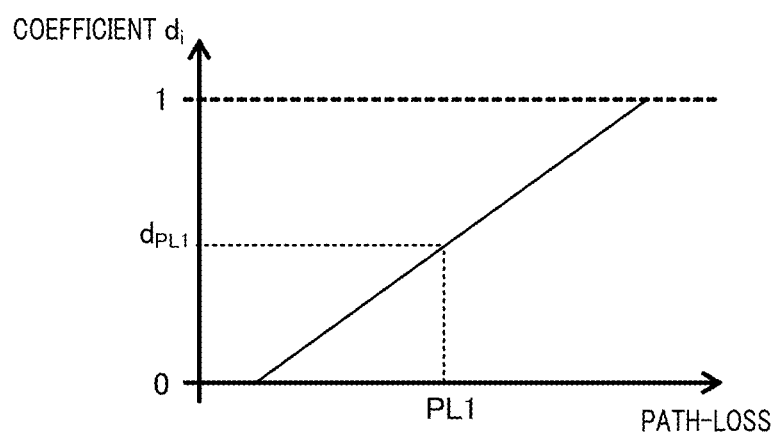
FIG. 9 describes coefficient calculation performed by a transmission power control weight calculating section.

FIG. 9 describes the coefficient calculation performed by transmission power control weight calculating section 23. Radio terminal 44 has a table for calculating (acquiring) the coefficient of the transmission power control weight from the path-loss. The table contains magnitudes of path-loss and coefficients corresponding thereto, and the magnitudes of path-loss and the coefficients have the relationship illustrated in FIG. 9. For example, coefficient "$d_i$" ($0 \leq d_i \leq 1$) increases as the magnitude of the path-loss increases.

Transmission power control weight calculating section 23 refers to the table based on the summed path-loss that occurs at each of the antenna elements to acquire the coefficient of the transmission power control weight.

For example, assume that the sum of the magnitudes of the path-loss at antenna element AT1 of radio terminal 44 is "PL1." In this case, in the example illustrated in FIG. 9, transmission power control weight calculating section 23 acquires coefficient "$d_{PL1}$." Transmission power control weight calculating section 23 similarly refers to the table to acquire coefficients for other antenna elements AT2 to AT4.

Having referred to the table to acquire a coefficient for each of the antenna elements of radio terminal 44, transmission power control weight calculating section 23 generates a transmission power control weight (transmission power control weight before normalization) from the acquired coefficient. The transmission power control weight is expressed by the following equation 3:

[3]

$$\hat{D} = \begin{bmatrix} d_1 & 0 & \cdots & 0 \\ 0 & d_2 & \ddots & \vdots \\ \vdots & \ddots & \ddots & 0 \\ 0 & \cdots & 0 & d_{N_{R1}} \end{bmatrix} \quad \text{(Equation 3)}$$

Equation 3 represents the transmission power control weight in a case where the total number of antenna elements of radio terminal 44 is "$N_{R1}$." In the case illustrated in FIG. 8, equation 3 is a "4×4" matrix.

Transmission power control weight calculating section 23 normalizes the transmission power control weight expressed by equation 3. For example, transmission power control weight calculating section 23 performs the computation expressed by equation 4 to calculate coefficient "β", which allows the sum of the diagonal components of the matrix is equivalent to the dimension of the matrix.

[4]

$$\hat{D}\hat{D}^H \quad \text{(Equation 4)}$$

The term "$(*)^H$" shown in equation 4 is complex conjugate transposition of the matrix.

When coefficient "β" is determined, a normalized transmission power control weight is determined from the following equation 5:

[5]

$$D = \beta \hat{D} \quad \text{(Equation 5)}$$

A transmission power control weight (D) calculated by transmission power control weight calculating section 23 is output to transmission power controlling section 26. Transmission power control weight "$\beta d_u$" ($u=1, N_{R1}$) is the weight corresponding to the u-th antenna element. That is, the power transmitted via the u-th antenna element is controlled by transmission power control weight "$\beta d_u$."

The coefficient of the transmission power control weight (D) relates to the path-loss in accordance with the relationship illustrated in FIG. 9. Therefore, the power transmitted via a large-path-loss antenna element is controlled to increase, whereas the power transmitted via a small-path-loss-antenna element is controlled to decrease. The process described above allows radio terminal 44 to improve the quality of the communication with the radio base station. It is noted that "$d_u=0$" indicates that the u-th antenna element is not used.

A description will be made of the estimation of the path-loss and the calculation of the transmission power control weight in the case of multiple users.

Figure 10:
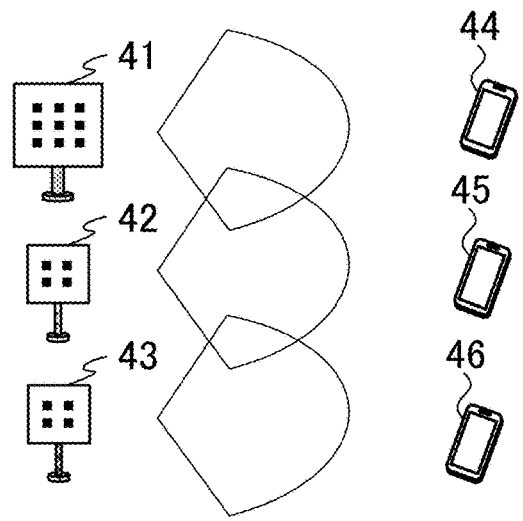
FIG. 10 describes a transmission power control weight in the case of multiple users.

FIG. 10 describes the transmission power control weight in the case of multiple users. In FIG. 10, the same components as those in FIG. 8 have the same reference character. In FIG. 10, three radio terminals 44 to 46 are present.

Also in the case of multiple users, radio terminals 44 to 46 can each calculate the transmission power control weight by using the method described with reference to FIGS. 8 and 9. The pre-normalization transmission power control weight obtained in each of radio terminals 44 to 46 is expressed by the following equation 6:

[6]

$$\hat{D} = \begin{bmatrix} d_{i1} & 0 & \cdots & 0 \\ 0 & d_{i2} & \ddots & \vdots \\ \vdots & \ddots & \ddots & 0 \\ 0 & \cdots & 0 & d_{iN_{Ri}} \end{bmatrix} \quad \text{(Equation 6)}$$

The subscript "i" contained in equation 6 represents that the coefficient with "i" is the coefficient for the i-th radio terminal. Coefficient "$d_{iu}$" satisfies "$0 \le d_{iu} \le 1$."

Transmission power control weight calculating section 23 calculates "$\beta_i$" for normalizing the transmission power control weight by using the method described with reference to FIGS. 8 and 9. When coefficient "$\beta_i$" is determined, the normalized transmission power control weight for each of radio terminals 44 to 46 is determined from the following equation 7:

[7]

$$D_i = \beta_i \hat{D}_i \quad \text{(Equation 7)}$$

As described above, also in the case of multiple users, radio terminals 44 to 46 can each calculate the transmission power control weight in the same manner as in the case of a single user.

Figure 11:
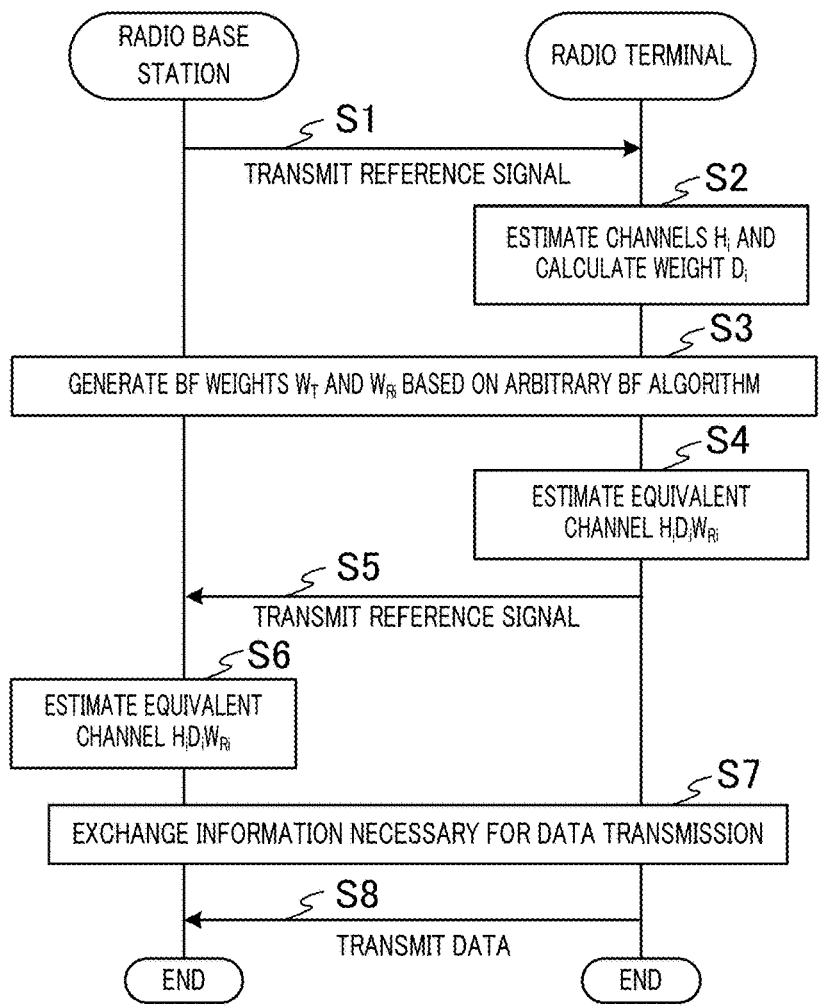
FIG. 11 is a sequence diagram illustrating an example of the operation of a radio base station and the radio terminal.

FIG. 11 is a sequence diagram illustrating an example of the operation of the radio base station (signal processing unit 2) and radio terminal 3a. Signal processing unit 2 in FIG. 1 first transmits the reference signal to radio terminal 3a (step S1).

Radio terminal 3a then estimates the channels ($H_i$) based on the reference signal transmitted in step S1 and calculates the transmission power control weight ($D_i$) (step S2).

Signal processing unit 2 and radio terminal 3a then generate the BF weights ($W_T$, $W_{Ri}$) based on an arbitrary BF algorithm (step S3).

Radio terminal 3a then estimates the equivalent channel ($H_i D_i W_{Ri}$) containing the transmission power control weight ($D_i$) calculated in step S2 and the BF weight ($W_{Ri}$) calculated in step S3 (step S4).

Radio terminal 3a then transmits a reference signal for allowing signal processing unit 2 to estimate the equivalent channel ($H_i D_i W_{Ri}$) (step S5).

Signal processing unit 2 then estimates the equivalent channel ($H_i D_i W_{Ri}$) based on the reference signal transmitted in step S5 (step S6).

Signal processing unit 2 and radio terminal 3a then exchange information necessary for data transmission (step S7).

Radio terminal 3a then transmits data to signal processing unit 2 (step S8).

Figure 12:
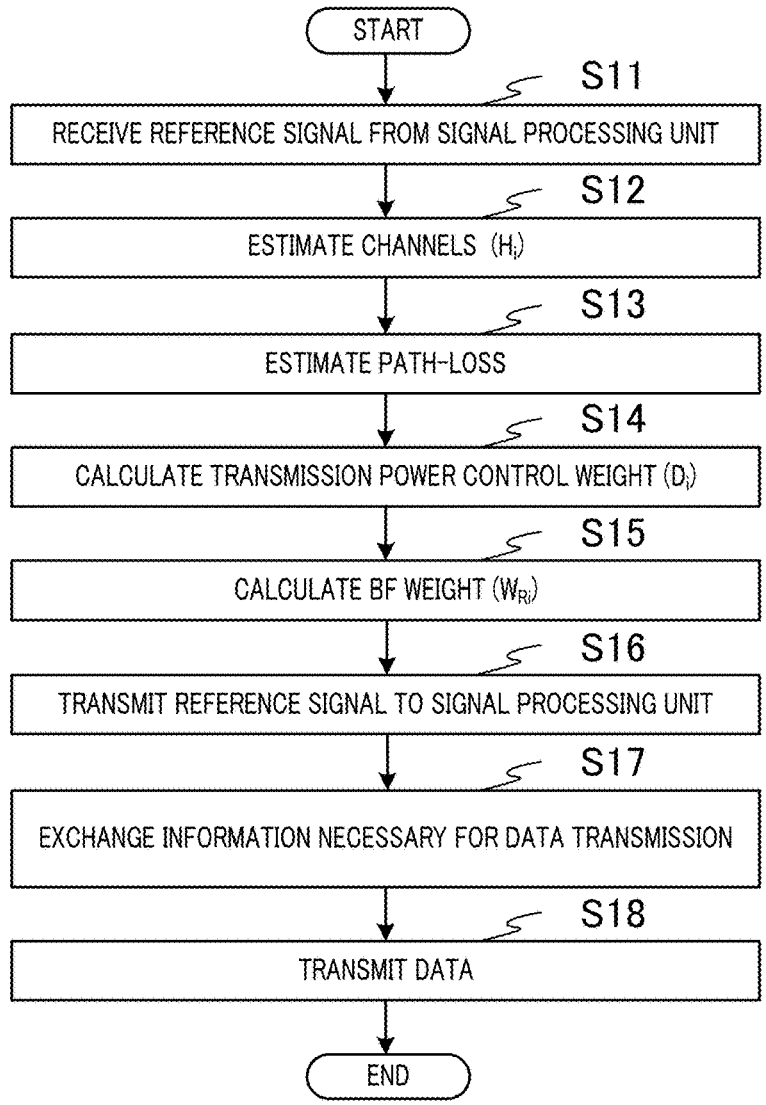
FIG. 12 is a flowchart illustrating an example of the operation of the radio terminal.

FIG. 12 is a flowchart illustrating an example of the operation of radio terminal 3a. Radio terminal 3a first receives the reference signal transmitted by signal processing unit 2 (step S11).

Radio terminal 3a then estimates the channels ($H_i$) between radio terminal 3a and transmission points 1a to 1i based on the reference signal received in step S11 (step S12).

Radio terminal 3a then estimates the path-loss between radio terminal 3a and transmission points 1a to 1i based on the channels ($H_i$) estimated in step S12 (step S13).

Radio terminal 3a then calculates the transmission power control weight ($D_i$) from the path-loss estimated in step S13 (step S14).

Radio terminal 3a then calculates the BF weight ($W_{Ri}$) from the equivalent channel ($H_i D_i$) containing the transmission power control weight ($D_i$) calculated in step S14 (step S15). It is noted that in the case where radio terminal 3a performs no BF, the BF weight is a unit matrix.

Radio terminal 3a then transmits the reference signal for allowing signal processing unit 2 to estimate the equivalent channel ($H_i D_i W_{Ri}$) (step S16).

Radio terminal 3a then exchanges the information necessary for data transmission with signal processing unit 2 (step S17).

Radio terminal 3a then transmits the data to signal processing unit 2 (step S18).

As described above, radio terminal 3a (or radio terminal 3b) performs radio communication with the radio base station including the plurality of transmission points 1a to 1i, each of which has at least one antenna element, and signal processing unit 2 connected to the plurality of transmission points 1a to 1i. Radio terminal 3a includes a plurality of antennas, and path-loss estimating section 22 of radio terminal 3a estimates the path-loss between the plurality of antenna elements and the plurality of transmission points 1a to 1i. Transmission power control weight calculating section 23 calculates the transmission power control weight for controlling transmission power of each of the plurality of antenna elements based on the path-loss of the antenna elements estimated by path-loss estimating section 22. The configuration described above allows radio terminal 3a to perform the transmission power control to improve the communication quality. Further, radio terminal 3a can perform the transmission power control based on the simple information (path-loss).

Further, transmission power control weight calculating section 23 calculates the transmission power control weight in such a way that the greater the path-loss estimated by path-loss estimating section 22, the greater the transmission power. The process described above allows radio terminal 3a to improve the communication quality even in a case where radio terminal 3a is located far away from transmission points 1a to 1i. Further, radio terminal 3a, when it is located in the vicinity of any of transmission points 1a to 1i, decreases the transmission power, whereby the interference power can be suppressed.

In FIG. 9, transmission power control weight calculating section 23 calculates the coefficient of the transmission power control weight by using the table, but not necessarily. For example, transmission power control weight calculating section 23 may calculate the coefficient of the transmission power control weight from the equation representing the relationship illustrated in FIG. 9 between the path-loss and the coefficient.

The relationship between the path-loss and the coefficient is not limited to the linear relationship illustrated in FIG. 9. For example, the relationship between the path-loss and the coefficient may be expressed, for example, by an n-dimensional function, a hyperbolic function, a reciprocal, or a step function.

Transmission power control weight calculating section 23, when calculating the coefficient, may use the path-loss as it is to calculate the coefficient or may exponentiate the path-loss to calculate the coefficient.

Further, the relationship between the path-loss and the coefficient illustrated in FIG. 9 may be changed for each of radio terminals 3a and 3b, based, for example, on a desired rate or an anticipated amount of interference associated with each of radio terminals 3a and 3b.

Further, in the above description, path-loss estimating section 22 uses the channels estimated by channel estimating section 21 to estimate the path-loss. Instead, path-loss estimating section 22 may estimate the path-loss from the power of the received reference signal or the SNR thereof.

The path-loss is not necessarily estimated by using the method described above. For example, radio terminals 3a and 3b may each transmit the reference signal to signal processing unit 2, and signal processing unit 2 may estimate the path-loss from the reference signals. Signal processing unit 2 may then transmit the estimated path-loss to each of radio terminals 3a and 3b.

Path-loss estimating section 22 may instead directly use the SNR of the reference signal as the path-loss. Path-loss estimating section 22 may still instead directly use the power of the received reference signal as the path-loss.

Embodiment 2

In Embodiment 1, the relationship between the path-loss and the coefficient is expressed by an increasing function. That is, in Embodiment 1, the transmission power of a transmission point to a greater-path-loss radio terminal is controlled to be greater.

In contrast, Embodiment 2 will be described with reference to a case where the relationship between the path-loss and the coefficient is expressed by a decreasing function. That is, in Embodiment 2, the power transmitted to a greater-path-loss radio terminal is controlled to be smaller. That is, a radio terminal in Embodiment 2, for example, stops performing the radio communication with a transmission point when the radio terminal is located in a position far away from the transmission point, whereas performing the radio communication with the transmission point when the radio terminal is located in a position close to the transmission point. Portions different from those in Embodiment 1 will be described below.

Figure 13:
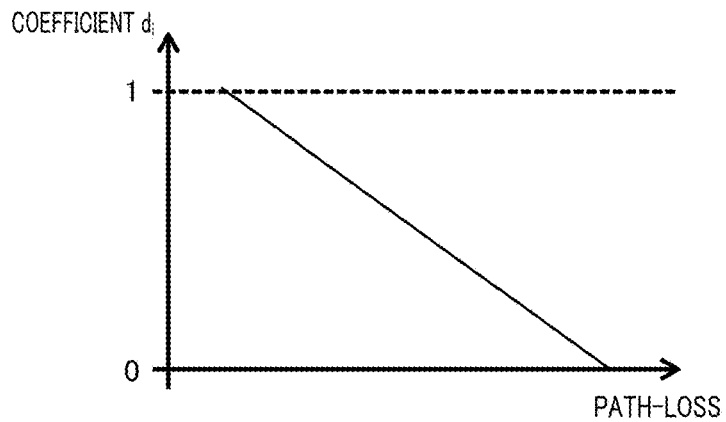
FIG. 13 describes the coefficient calculation performed by the transmission power control weight calculating section according to Embodiment 2.

FIG. 13 describes the coefficient calculation performed by transmission power control weight calculating section 23 according to Embodiment 2. Radio terminals 3a and 3b each have a table for calculating (acquiring) the coefficient of the transmission power control weight from the path-loss estimated by path-loss estimating section 22. The table has magnitudes of the path-loss and coefficients corresponding thereto, and the magnitudes of the path-loss and the coefficients have the relationship illustrated in FIG. 13. For example, the coefficient decreases as the path-loss increases.

Transmission power control weight calculating section 23 refers to the table based on the path-loss estimated by path-loss estimating section 22 to acquire the coefficient ($d_{iu}$) of the transmission power control weight ($D_i$), as in Embodiment 1. Transmission power control weight calculating section 23 then use the acquired coefficient to calculate the transmission power control weight ($D_i$).

The coefficient of the transmission power control weight relates to the path-loss in accordance with the relationship illustrated in FIG. 13. Therefore, the power transmitted to a large-path-loss antenna element is therefore controlled to decrease, whereas the power transmitted to a small-path-loss antenna element is controlled to increase. According to the process described above, radio terminals 3a and 3b, for example, when they are located in positions far away from any of transmission points 1a to 1i, stop communicating with transmission points 1a to 1i. On the other hand, radio terminals 3a and 3b, when they are located in positions close to transmission points 1a to 1i, improve the quality of the communication with transmission points 1a to 1i.

As described above, transmission power control weight calculating section 23 calculates the transmission power control weight in such a way that the greater the path-loss estimated by path-loss estimating section 22, the smaller the transmission power. The process described above allows radio terminals 3a and 3b to reduce the interference power and improve the communication quality.

The relationship between the path-loss and the coefficient is not limited to the linear relationship illustrated in FIG. 13. For example, the relationship between the path-loss and the coefficient may be expressed, for example, by an n-dimensional function, a hyperbolic function, a reciprocal, or a step function.

Embodiment 3

Embodiment 3 will be described with reference to a case where the radio base station calculates the transmission power control weight. Portions different from those in Embodiment 1 will be described below. In Embodiment 3, the radio base station has the same blocks as those illustrated in FIG. 6. For example, the radio base station includes a channel estimating section, a path-loss estimating section, a transmission power control weight calculating section, a BF weight generating section, a BF section, and a transmission power controlling section.

The channel estimating section of the radio base station estimates the channels ($H_i$) between the radio base station and radio terminals 3a, 3b.

Path-loss estimating section of the radio base station estimates the path-loss that occurs at the antenna elements of radio terminals 3a and 3b from the channels estimated by the channel estimating section.

The transmission power control weight calculating section of the radio base station generates the transmission power control weight ($D_i$) for controlling the transmission power of radio terminals 3a and 3b based on the path-loss estimated by the path-loss estimating section. The transmission power control weight calculating section calculates the transmission power control weight ($D_i$) for controlling the transmission power of radio terminals 3a and 3b by using the same method used by transmission power control weight calculating section 23.

The BF weight generating section of the radio base station generates the equivalent channel (equivalent channel matrix $H_iD_i$) containing the transmission power control weight ($D_i$) calculated by the transmission power control weight calculating section. The BF weight generating section uses the generated equivalent channel ($H_iD_i$) to generate a BF weight ($W_{Ti}$) for forming a transmission beam. The BF weight generating section may instead generate the BF weight by using any other arbitrary method.

The BF section and the transmission power controlling section of the radio base station multiply the reference signal by the BF weight ($W_{Ti}$) generated by the BF weight generating section and the transmission power control weight ($D_i$) generated by the transmission power control weight calculating section. The reference signal multiplied by the BF weight ($W_{Ti}$) and the transmission power control weight ($D_i$) is transmitted to radio terminals 3a and 3b.

Radio terminals 3a and 3b estimate the equivalent channels ($W_{Ti}H_iD_i$) between radio terminals 3a, 3b and the radio base station from the reference signal transmitted from the radio base station. Radio terminals 3a and 3b perform data transmission based on the estimated equivalent channels ($W_{Ti}H_iD_i$). Since the equivalent channels each contain the transmission power control weight ($D_i$), radio terminals 3a and 3b perform the data transmission under the transmission power control based on the transmission power control weight ($D_i$).

Figure 14:
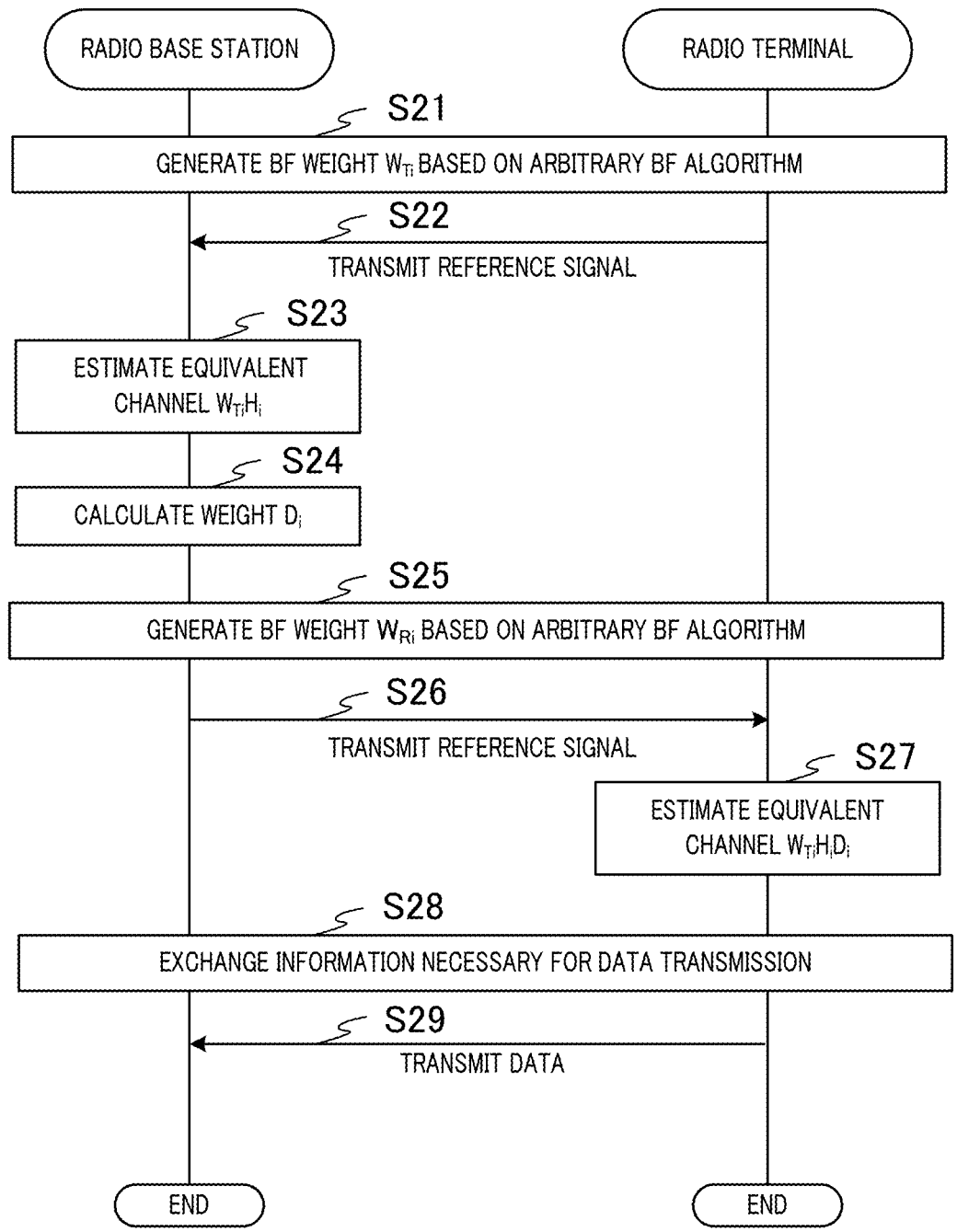
FIG. 14 is a sequence diagram illustrating an example of the operation of the radio base station and the radio terminal according to Embodiment 3.

FIG. 14 is a sequence diagram illustrating an example of the operation of the radio base station (signal processing unit 2) and radio terminal 3a according to Embodiment 3. The radio base station and radio terminal 3a first generate the BF weight ($W_{Ti}$) for the radio base station based on an arbitrary BF algorithm (step S21). In a case where no BF is performed, the BF weight ($W_{Ti}$) is a unit matrix.

Radio terminal 3a then transmits the reference signal to the radio base station (step S22).

The channel estimating section of the radio base station then estimates the equivalent channel ($W_{Ti}H_i$) between the radio base station and radio terminal 3a based on the reference signal transmitted in step S22 (step S23).

The path-loss estimating section of the radio base station then estimates the path-loss that occurs in each of the antenna elements of radio terminal 3a from the equivalent channel ($W_{Ti}H_i$) estimated in step S23. The transmission power control weight calculating section then calculates the transmission power control weight ($D_i$) for controlling the transmission power of radio terminal 3a based on the path-loss estimated by the path-loss estimating section (step S24).

The radio base station and radio terminal 3a then generate the BF weight ($W_{Ri}$) for radio terminal 3a based on an arbitrary BF algorithm (step S25). In a case where no BF is performed, the BF weight ($W_{Ri}$) is a unit matrix.

The BF section and the transmission power controlling section of the radio base station then multiply the reference signal by the BF weight ($W_{Ti}$) generated by the BF weight generating section and the transmission power control weight ($D_i$) generated by the transmission power control weight calculating section. The radio base station transmits the reference signal multiplied by the BF weight ($W_{Ti}$) and the transmission power control weight ($D_i$) to radio terminal 3a (step S26).

Radio terminal 3a then uses the reference signal transmitted in step S26 to estimate the equivalent channel ($W_{Ti}H_iD_i$) (step S27). Radio terminal 3a multiplies the estimated equivalent channel by the BF weight ($W_{Ri}$) generated in step S25.

Radio terminal 3a then exchanges the information necessary for data transmission with signal processing unit 2 (step S28).

Radio terminal 3a then transmits data to signal processing unit 2 (step S29). In this process, radio terminal 3a performs the data transmission by using the BF weight ($W_{Ri}$) generated in step S25 and the transmission power control weight ($D_i$) estimated in step S27.

As described above, the radio base station includes a plurality of transmission points each having at least one antenna element and a signal processing unit connected to the plurality of transmission points. The path-loss estimating section of the radio base station estimates the path-loss between the radio base station and each of the plurality of antenna elements of radio terminals 3a and 3b. The transmission power control weight calculating section calculates the power control weight for controlling the transmission power of each of the plurality of antenna elements of radio terminals 3a and 3b based on the path-loss that occurs at the antenna elements of radio terminals 3a and 3b estimated by the path-loss estimating section. The configuration described above allows the radio base station to improve the communication quality.

The transmission power control weight calculating section of the radio base station may set $D_i$ for any of radio terminals 3a and 3b that the radio base station desires to cause it to stop uplink data transmission to be a zero matrix based, for example, on a desired rate or an anticipated amount of interference associated with each of radio terminals 3a and 3b. The process described above allows the radio base station to perform user scheduling.

The radio base station may include a transmitting section that transmits information on the transmission power control weight calculated by the transmission power control weight calculating section to radio terminals 3a and 3b.

Embodiments have been described above. Embodiments can be combined with each other. For example, Embodiments 1 and 2 may be combined with each other or Embodiments 2 and 3 may be combined with each other.

(Hardware Configuration)

Note that the block diagrams used to describe the embodiments illustrate blocks on the basis of functions. These functional blocks (constituent sections) are implemented by any combination of hardware and/or software. A means for realizing the functional blocks is not particularly limited. That is, the functional blocks may be implemented by one physically and/or logically coupled apparatus. Two or more physically and/or logically separated apparatuses may be directly and/or indirectly (for example, wired and/or wireless) connected, and the plurality of apparatuses may implement the functional blocks.

Figure 15:
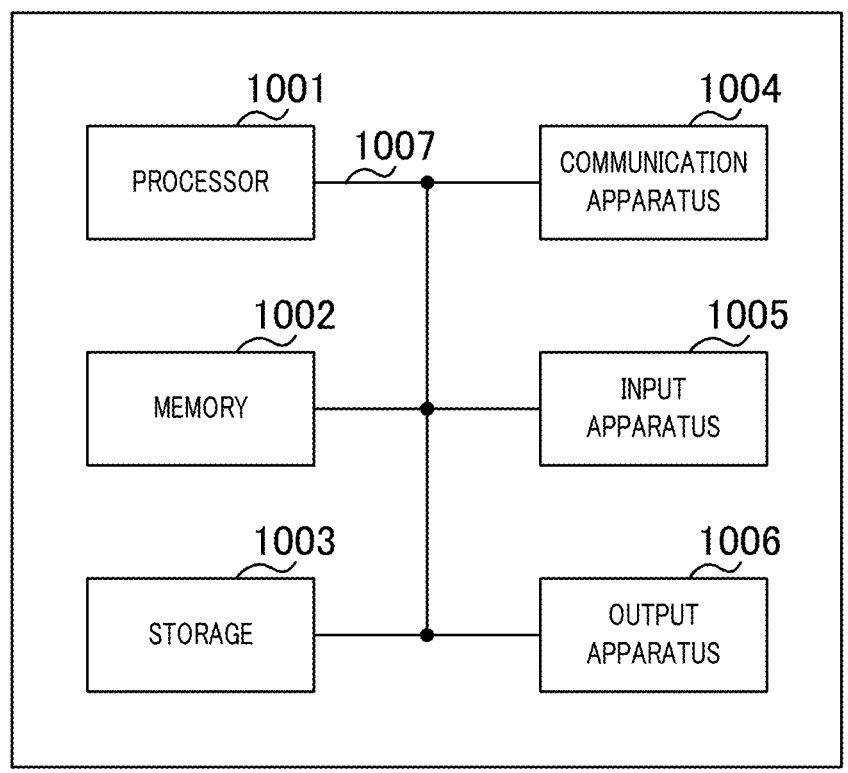
FIG. 15 illustrates an example of the hardware configuration of a radio base station and a radio terminal according to an embodiment of the present invention.

For example, a radio base station, radio terminals, and other components in an embodiment of the present invention may function as a computer that performs the processes of the radio communication method according to the present invention. FIG. 15 illustrates an example of a hardware configuration of the radio base station and the radio terminal according to an embodiment of the present invention. The radio base station and radio terminal as described above may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of the radio base station and of the radio terminal may include one or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

The functions of the radio base station and the radio terminal can be achieved by causing processor 1001, memory 1002, or any other piece of hardware to read predetermined software (program) to cause processor 1001 to perform operation and controlling communication based on communication apparatus 1004 or reading/writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, channel estimating section 21, path-loss estimating section 22, transmission power control weight calculating section 23, BF weight generating section 24, BF section 25, transmission power controlling section 26, transmission weight generating section 28, transmission weight section 29, BF weight generating section 32, reception BF section 33, equivalent channel estimating section 34, reception filter generating section 35, reception filter section 36, data signal estimating section 37, and other components described above may be achieved by processor 1001. Further, the tables described above may be stored in memory 1002.

Processor 1001 reads out a program (program code), a software module, or data from storage 1003 and/or communication apparatus 1004 to memory 1002 and executes various types of processing according to the read-out program or the like. The program used is a program for causing the computer to execute at least part of the operation described in the embodiments. For example, at least part of the functional blocks that configure the radio base station and the radio terminal may be achieved by a control program that is stored in memory 1002 and operates on processor 1001, and the other functional blocks may be similarly achieved. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, the radio base station and the radio terminal may include hardware, such as a microprocessor, a digital signal processor (DSP), an ASIC (Application Specific Integrated Circuit), a PLD (Programmable Logic Device), and an FPGA (Field Programmable Gate Array), and the hardware may implement part or all of the functional blocks.

For example, processor 1001 may be implemented by at least one of these pieces of hardware.

(Notification and Signaling of Information)

The notification of information is not limited to the aspects or embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

(Adaptive System)

The aspects and embodiments described in the present specification may be applied to a system using LTE (Long Term Evolution), LTE-A (LTE-Advanced), SUPER 3G IMT-Advanced, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

(Processing Procedure and the Like)

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations which are described in the specification as being performed by the base station (radio base station) may sometimes be performed by an upper node depending on the situation. Various operations performed for communication with a terminal in a network including one network node or a plurality of network nodes including a base station can be obviously performed by the base station and/or a network node other than the base station (examples include, but not limited to, MME (Mobility Management Entity) or S-GW (Serving Gateway)). Although there is one network node in addition to the base station in the case illustrated above, a plurality of other network nodes may be combined (for example, MME and S-GW).

(Direction of Input and Output)

The information, the signals, and the like can be output from a higher layer (or a lower layer) to a lower layer (or a higher layer). The information, the signals, and the like may be input and output through a plurality of network nodes.

(Handling of Input and Output Information and the Like)

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

("System" and "Network")

The terms "system" and "network" used in the present specification can be interchangeably used.

(Names of Parameters and Channels)

The information, the parameters, and the like described in the present specification may be expressed by absolute values, by values relative to predetermined values, or by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station (radio base station) can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head(RRH)). The term "cell" or "sector" denotes part or all of the coverage area of the base station and/or of the base station subsystem that perform the communication service in the coverage. Furthermore, the terms "base station," "eNB," "cell," and "sector" can be interchangeably used in the present specification. The base station may be called a fixed station, a NodeB, an eNodeB (eNB), an access point, a femto cell, a small cell, or the like.

(Terminal)

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

(Meaning and Interpretation of Terms)

As used herein, the term "determining" may encompass a wide variety of actions. For example, "determining" may be regarded as judging, calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing and the like. That is, "determining" may be regarded as a certain operation of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The reference signal can also be abbreviated as RS and may also be called a pilot depending on the applied standard. The correction RS may be called a TRS (Tracking RS), a PC-RS (Phase Compensation RS), a PTRS (Phase Tracking RS), or an additional RS. The demodulation RS and the correction RS may be called by other corresponding names, respectively. The demodulation RS and the correction RS may be specified by the same name (for example, demodulation RS).

The description "based on" used in the present specification does not mean "based only on," unless otherwise specifically stated. In other words, the description "based on" means both of "based only on" and "based at least on."

The "section" in the configuration of each apparatus may be replaced with "means," "circuit," "device," or the like.

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

The radio frame may be constituted by one frame or a plurality of frames in the time domain. The one frame or each of the plurality of frames may be called a subframe, a time unit, or the like in the time domain. The subframe may be further constituted by one slot or a plurality of slots in the time domain. The slot may be further constituted by one symbol or a plurality of symbols (OFDM (Orthogonal Frequency Division Multiplexing) symbol, SC-FDMA (Single Carrier-Frequency Division Multiple Access) symbol, or the like) in the time domain.

The radio frame, the subframe, the slot, and the symbol indicate time units in transmitting signals. The radio frame, the subframe, the slot, and the symbol may be called by other corresponding names.

For example, in the LTE system, the base station creates a schedule for assigning radio resources to each mobile station (such as frequency bandwidth that can be used by each mobile station and transmission power). The minimum time unit of scheduling may be called a TTI (Transmission Time Interval).

For example, one subframe, a plurality of continuous subframes, or one slot may be called a TTI.

The resource unit is a resource assignment unit in the time domain and the frequency domain, and the resource unit may include one subcarrier or a plurality of continuous subcarriers in the frequency domain. In addition, the resource unit may include one symbol or a plurality of symbols in the time domain, and may have a length of one slot, one subframe, or one TTI. One TTI and one subframe may be constituted by one resource unit or a plurality of resource units. The resource unit may be called a resource block (RB), a physical resource block (PRB: Physical RB), a PRB pair, an RB pair, a scheduling unit, a frequency unit, or a subband. The resource unit may be constituted by one RE or a plurality of REs. For example, one RE only has to be a resource smaller in unit size than the resource unit serving as a resource assignment unit (for example, one RE only has to be a minimum unit of resource), and the naming is not limited to RE.

The structure of the radio frame is illustrative only, and the number of subframes included in the radio frame, the number of slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

(Variations and the Like of Aspects)

The aspects and embodiments described in the present specification may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

INDUSTRIAL APPLICABILITY

An aspect of the present invention is useful in a mobile communication system.

The present patent application is based on Japanese Patent Application No. 2017-039677 filed on Mar. 2, 2017 and claims priority thereof, and the entire contents of Japanese Patent Application No. 2017-039677 are incorporated in the present application.

REFERENCE SIGNS LIST 1a to 1i Transmission point
2 Signal processing unit
21 Channel estimating section
22 Path-loss estimating section
23 Transmission power control weight calculating section
24 BF weight generating section
25 BF section
26 Transmission power controlling section
27 Antenna element

The invention claimed is:

1. A terminal that performs radio communication with a base station including: a plurality of transmission points each including at least one antenna element; and a signal processing unit connected to the plurality of transmission points, the terminal comprising:
a plurality of antenna elements;
a processor that:
estimates path-loss between each of the plurality of antenna elements, and the plurality of transmission points, and
sums, in each of the plurality of antenna elements, the path-loss of each of the plurality of transmission points,
calculates a first coefficient for each summed path-loss based on a pre-defined positive relationship, wherein each first coefficient has a value between or equal to 0 and 1, and
calculates a power control weight for controlling transmission power of each of the plurality of antenna elements,
wherein the processor calculates a coefficient of the power control weight using the calculated first coefficients in a linear system in such a way that the greater the path-loss estimated by the processor, the greater the transmission power; and
a transmitter that transmits a reference signal multiplied by both the power control weight and a beamforming weight to the base station,
wherein the processor performs calculations in accordance with an equation $r=\alpha Hs+z$.

2. A method for controlling transmission power of a terminal that includes a plurality of antenna elements, the terminal performing radio communication with a base station, the base station including: a plurality of transmission points each including at least one antenna element; and a signal processing unit connected to the plurality of transmission points, the method comprising:
estimating path-loss between each of the plurality of antenna elements and the plurality of transmission points;
summing, in each of the plurality of antenna elements, the path-loss of each of the plurality of transmission points;
calculating a first coefficient for each summed path-loss based on a table describing a pre-defined positive relationship, wherein each first coefficient having a value between or equal to 0 and 1,
calculating a power control weight for controlling transmission power of each of the plurality of antenna elements based on the summed path-loss,
wherein a coefficient of the power control weight is calculated using the calculated first coefficients in a linear system in such a way that the greater the path-loss estimated, the greater the transmission power; and
transmitting a reference signal multiplied by both the power control weight and a beamforming weight,
wherein the terminal performs calculations in accordance with an equation $r=\alpha Hs+z$.

3. A base station including: a plurality of transmission points each including at least one antenna element; and a signal processing unit connected to the plurality of transmission points, the base station comprising:
a processor that:
estimates path-loss between the base station and a plurality of antenna elements of a terminal,
sums, in each of the plurality of antenna elements, the path-loss of each of the plurality of transmission points,
calculates a first coefficient for each summed path-loss based on a pre-defined positive relationship, wherein each first coefficient has a value between or equal to 0 and 1, and
calculates a power control weight for controlling transmission power of each of the plurality of antenna elements based on the summed path-loss, wherein a coefficient of the power control weight is calculated by using calculated first coefficients in a linear system; and
a transmitter that transmits a reference signal multiplied by both the power control weight and a beamforming weight to the terminal,
wherein the processor performs calculations in accordance with an equation $r=\alpha Hs+z$.

4. The base station according to claim 3, further comprising a transmitter that transmits the power control weight calculated by the processor to the terminal.

* * * * *